United States Patent
Hahn

(10) Patent No.: US 8,422,412 B2
(45) Date of Patent: Apr. 16, 2013

(54) DUPLEXER AND SWITCH ENHANCEMENT

(75) Inventor: Wilhelm Steffen Hahn, Los Altos, CA (US)

(73) Assignee: Quellan, Inc., Santa Clara, CA (US)

( * ) Notice: Subject to any disclaimer, the term of this patent is extended or adjusted under 35 U.S.C. 154(b) by 599 days.

(21) Appl. No.: 12/432,013

(22) Filed: Apr. 29, 2009

(65) Prior Publication Data

US 2010/0278085 A1    Nov. 4, 2010

(51) Int. Cl.
*H04B 3/20* (2006.01)

(52) U.S. Cl.
USPC .......................................... 370/286

(58) Field of Classification Search .................. None
See application file for complete search history.

(56) References Cited

U.S. PATENT DOCUMENTS

| | | | |
|---|---|---|---|
| 6,081,593 A * | 6/2000 | Kim | 379/406.08 |
| 6,385,435 B1 | 5/2002 | Lee | |
| 6,622,030 B1 * | 9/2003 | Romesburg et al. | 455/570 |
| 6,799,062 B1 * | 9/2004 | Piket et al. | 455/569.1 |
| 7,035,388 B2 | 4/2006 | Kurosaki | |
| 7,050,388 B2 | 5/2006 | Kim et al. | |
| 7,123,676 B2 | 10/2006 | Gebara et al. | |
| 7,366,244 B2 | 4/2008 | Gebara et al. | |
| 7,702,295 B1 * | 4/2010 | Nicholls et al. | 455/78 |
| 7,840,012 B2 * | 11/2010 | De Poortere | 381/57 |
| 2005/0186920 A1 * | 8/2005 | Staszewski et al. | 455/114.1 |
| 2007/0015468 A1 * | 1/2007 | Kouki et al. | 455/63.1 |
| 2007/0060059 A1 | 3/2007 | Kim et al. | |
| 2007/0064923 A1 | 3/2007 | Schmukler et al. | |
| 2009/0016545 A1 | 1/2009 | Stelliga et al. | |
| 2010/0158141 A1 * | 6/2010 | Hewavithana et al. | 375/260 |

\* cited by examiner

*Primary Examiner* — Otis L Thompson, Jr.
(74) *Attorney, Agent, or Firm* — King & Spalding

(57) ABSTRACT

A signal selector enhancer suitable for portable electronic devices and base stations is disclosed. In one embodiment, the enhancer can include: a filter for receiving a signal from a first node, and for providing a filtered signal output therefrom, where the first node is coupled to a signal selector; and a noise canceller for receiving the filtered signal output, and for providing an adjusted filtered signal at a second node, where the second node is coupled to the signal selector, and where an operation of the signal selector is enhanced by the filter and the noise canceller arrangement.

20 Claims, 8 Drawing Sheets

DUPLEXER AND SWITCH ENHANCEMENT

FIELD OF THE INVENTION

The invention relates in general to noise cancellation associated with electronic devices, and more specifically to noise cancellation for duplexer and switch enhancement.

BACKGROUND

Base stations, as well as portable computing or electronic devices typically include switches and duplexers for selecting between signals and/or frequencies. However, electromagnetic interference (EMI) disturbances or other interference can affect operation of such switches and duplexers. These disturbances may interrupt, obstruct, cause leakage in, or otherwise degrade or limit effective switch, duplexer, filter, or other circuit performance.

SUMMARY

A signal selector enhancer suitable for portable electronic devices and base stations is disclosed. In one embodiment, the enhancer can include: a filter for receiving a signal from a first node, and for providing a filtered signal output therefrom, where the first node is coupled to a signal selector; and a noise canceller for receiving the filtered signal output, and for providing an adjusted filtered signal at a second node, where the second node is coupled to the signal selector, and where an operation of the signal selector is enhanced by the filter and the noise canceller arrangement.

In one embodiment, a method of enhancing a signal selector operation can include: filtering a signal received from a first node to provide a filtered signal therefrom, where the first node is coupled to a signal selector; adjusting the filtered signal output to provide an adjusted filtered signal at a second node, where the second node is coupled to the signal selector; and combining the adjusted filtered signal with an output of the signal selector such that an operation of the signal selector is enhanced.

In one embodiment, a signal module can include: an antenna for receiving and transmitting electromagnetic signals at a signal selector; a transmitter coupled to a transceiver for providing a transmit signal at a first node; a receiver coupled to a transceiver for receiving a receiver signal at a second node; and a signal selector enhancer.

DETAILED DESCRIPTION

Particular embodiments can include enhancements to switches and/or duplexers for improved operation thereof. Such enhancements can include one or more cancellers for canceling noise, interference, transmitter signals, and/or spurs, such as for cancellation in association with an antenna module. Various detector designs or direct tapping circuits can also be utilized in particular embodiments to effectively target particular antenna patterns or characteristics for noise signal pick-up.

Figure 1:
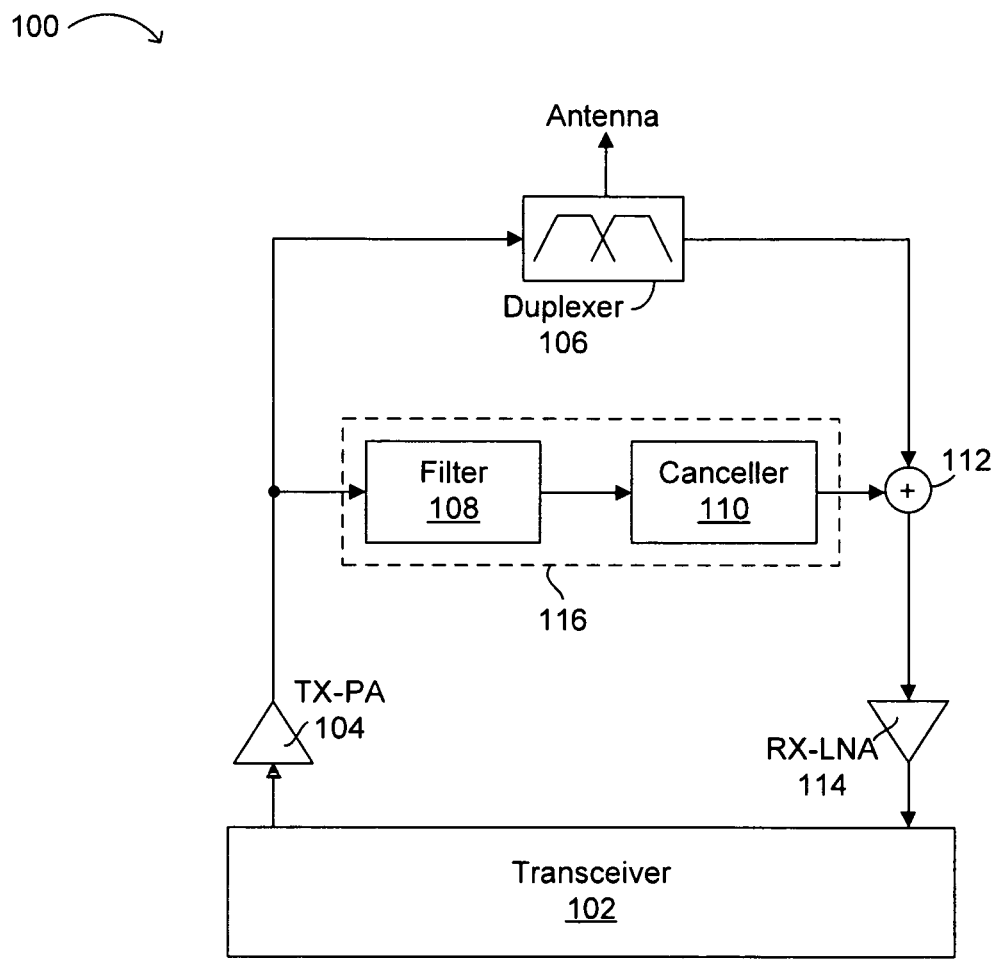
FIG. 1 is a block schematic diagram showing an example signal selector enhancer arrangement.

Referring now to FIG. 1, shown is a block schematic diagram 100 of an example signal selector enhancer arrangement. In this particular example, transceiver 102 (e.g., digital or analog transceiver) can provide signaling to transmit power amplifier (TX-PA) 104, and may receive signaling from receive low noise amplifier (RX-LNA) 114. Duplexer 106 can be used to separate transmit frequencies (e.g., from about 925 MHz to about 960 MHz) from receive frequencies (e.g., from about 880 MHz to about 915 MHz). Duplexer 106 can thus provide a selection or switching that prevents transmit frequencies from being received when in receive mode, and vice versa, as well as antenna directivity. However, leakage can occur in some applications from the transmit side to the receive side due to insufficient signal isolation.

In particular embodiments, signal selector enhancer 116 can be arranged substantially in parallel with duplexer 106 to improve the operation (e.g., isolation) of the duplexer. Signal selector enhancer 116 can include filter 108, which provides a filtered signal to an adjusted signal generator or noise canceller 110. The "noise canceller," "adjusted signal generator," or "canceller" as described herein can be any suitable signal adjustor, such as one that provides gain, phase, and/or delay adjustment to the filtered signal. An output from noise canceller 110 can be added at summation circuit 112 with a signal from duplexer 106 in the receive path to RX-LNA 114. Filter 108 can substantially, or at least partially, match the duplexer 106, and may be any suitable circuit or functional variation. For example, filter 108 can be a lower-quality version or part of duplexer 106, a delay element, a filter element (as shown in the particular example of FIG. 1), or any suitable matching variant of the corresponding signal selector (e.g., duplexer 106).

Particular embodiments may not need tapping optimization due to a single well known potential interferer (TX) in this application. Thus, a fixed coupling channel can reside inside a passive (or active) device solely varying with process spread. Further, no significant amount of software may be needed in certain embodiments because appropriate parameters may be added during manufacturing testing of the base station or subsystem application, and stored in erasable programmable read-only memory (EEPROM) flash memory (e.g., containing temperature dependency look-up table (LUT)). In addition, such a duplexer application allows for multiple signal selector enhancer and noise canceller deployments, such as TX to RX leakage reduction, TX mask clean-up, and/or RX mask clean-up. Examples of various arrangements will be shown below.

Particular embodiments can accommodate antenna connections for a base station, a cell phone, or any suitable device. Because leakage between transmit and receive sides can be abated such that receivers can sufficiently isolate from associated transmitters, signals can be received across a wide dynamic range or spectrum. Thus, receiver sensitivity is improved by avoiding interference from the transmitter at the same or neighbored base stations, and instead receiving signals from other sources. For example, typical isolation can be improved from about 55 dB to about 80 dB at a 15 MHz offset.

Figure 2:
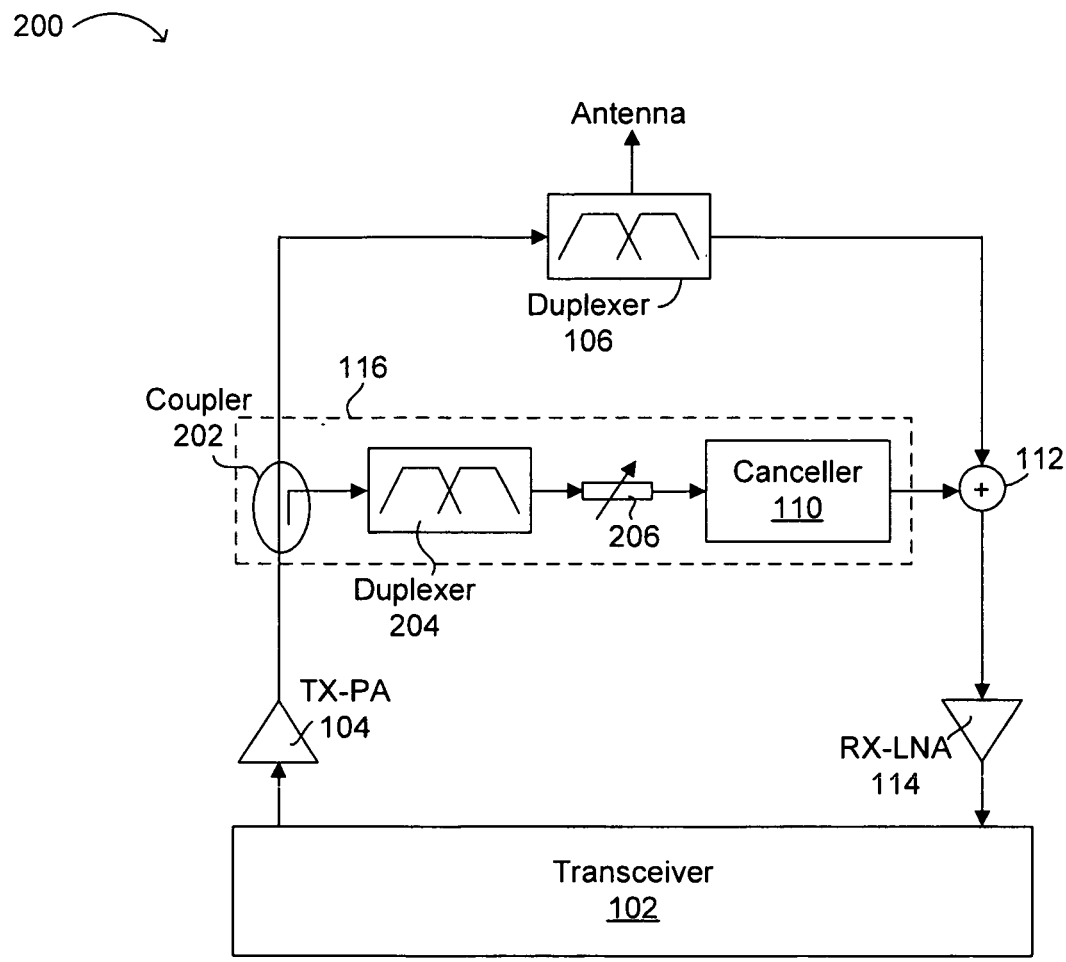
FIG. 2 is a block schematic diagram showing an example signal selector enhancer arrangement with an attenuator and coupler.

Referring now to FIG. 2, shown is a more detailed block schematic diagram 200 of an example signal selector enhancer arrangement with an attenuator and coupler. In this example, signal selector enhancer 116 includes coupler 202, as well as attenuator 206. For example, in an optimal enhancement setting, a gain of noise canceller 110 can be close or equal to a gain of attenuator 206 plus a gain of coupler 202. Also, the example of FIG. 2 shows a duplexer 204 that may be a lower quality variant of corresponding duplexer 106.

Figure 3:
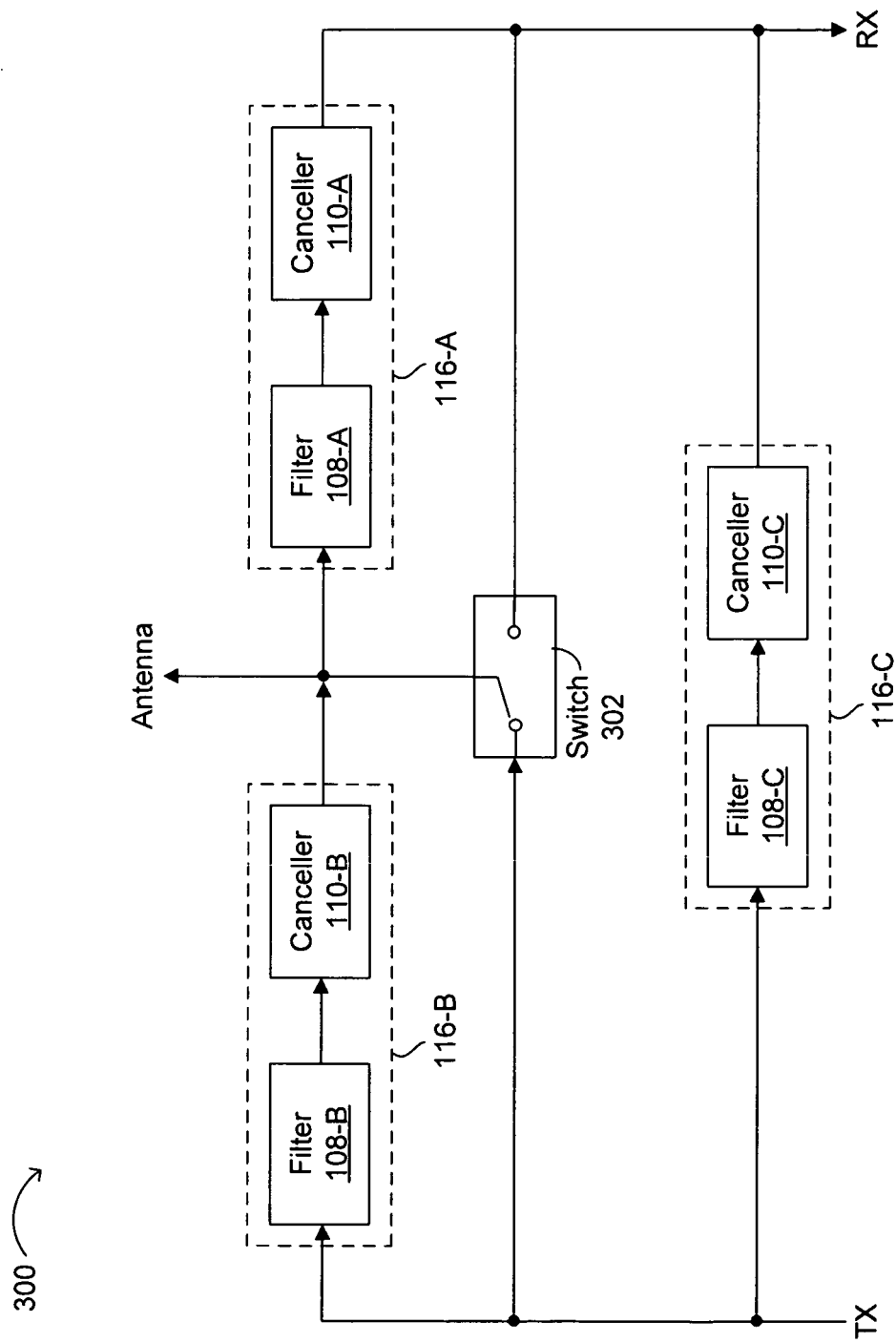
FIG. 3 is a block schematic diagram showing an example signal selector enhancer structure for each of three terminals in a switch.

Referring now to FIG. 3, shown is a block schematic diagram 300 of an example signal selector enhancer structure for each of three terminals in, e.g., a TX/RX switch. In this example, switch 302 is provided as the signal selector, with terminals to the antenna, the TX side and the RX side. Here, enhancer 116-A (e.g., filter 108-A and noise canceller 110-A) can be positioned between the antenna and the RX path in order to effectively clean up the RX spectrum. This can provide for improved filtering to avoid disturbance from other base stations. Thus, RX mask improvement can be achieved with essentially a tunable and relatively inexpensive RX pre-filter mechanism. Such improvement on the receive side can also avoid saturation of the RX-LNA. Thus, noise canceller 110-A can improve isolation of a signal selector (e.g., a duplexer, switch 302, etc.). In one application, a duplexer may be used in a code division multiple access (CDMA) phone because the frequency of the transmission is the received frequency.

Enhancer 116-B (e.g., filter 108-B and noise canceller 110-B) can be used for TX mask improvement. Such improvement can avoid higher losses in a duplexer, or TX pre-filter, and can also allow for power reduction in the transmit power amplifier (TX-PA). For example, up to 20 dB of improvement can be achieved close to the TX edge. Generally, switches are worse than duplexers in terms of leakage, so it is important to ensure that transmitters are sufficiently "off" on the transmit side in order to provide an isolation improvement.

For TX to RX isolation, enhancer 116-C (e.g., filter 108-C and noise canceller 110-C) can be added as shown. For example, one comparable or matched device to switch (or duplexer) 302 can be provided as filter 108-C in the canceller path. For example, an improvement of about 15 dB can be achieved over about 20 MHz with a single canceller arrangement, and about 15 dB over about 35 MHz for a double canceller arrangement. This improvement can reduce the cost of high end duplexers by a factor of about 10, and the board size by a factor of about 4.

Figure 4:
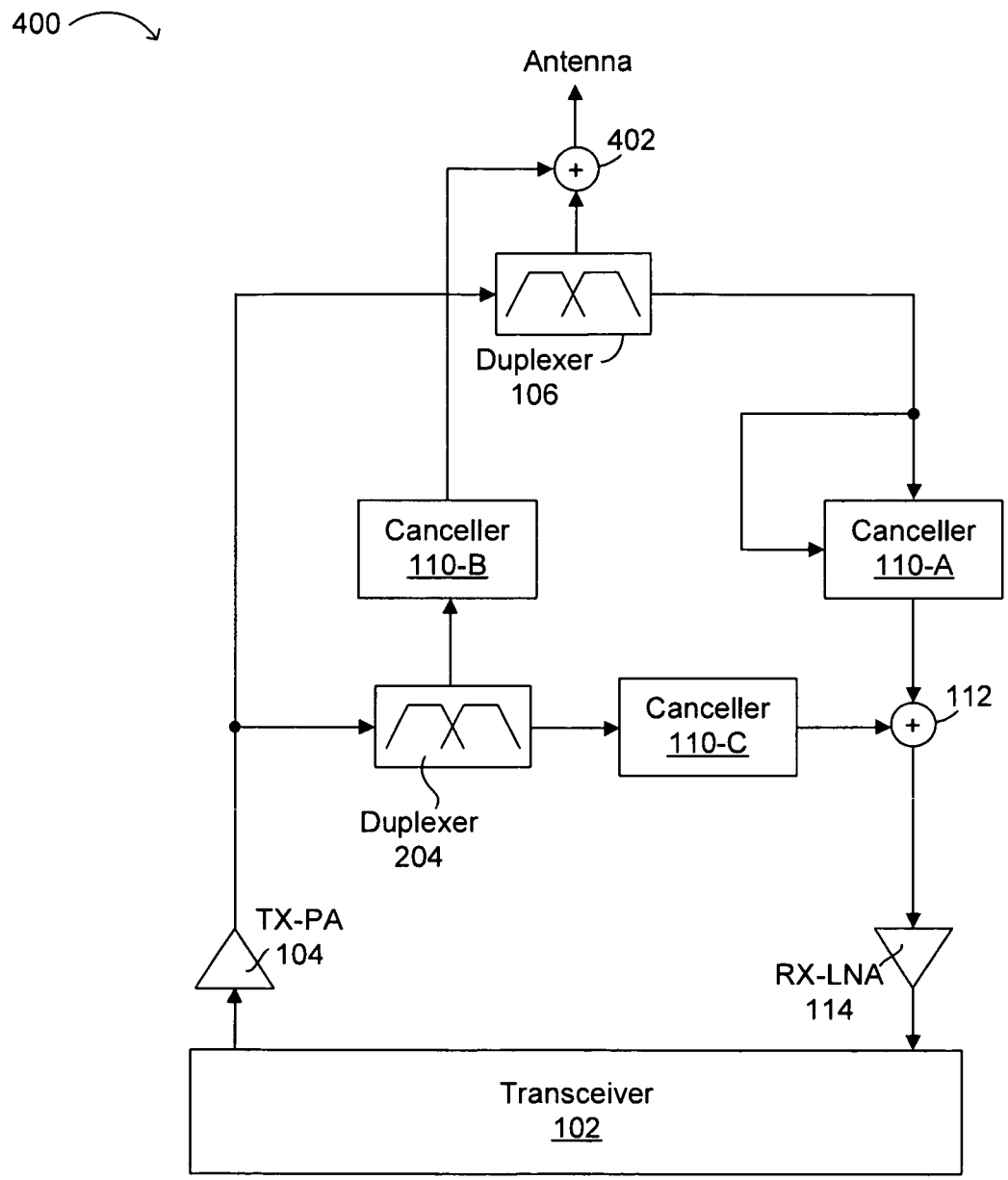
FIG. 4 is a block schematic diagram showing an example signal selector enhancer structure for each of three terminals of a duplexer.

Referring now to FIG. 4, shown is a block schematic diagram 400 of an example signal selector enhancer structure for each of three terminals in a duplexer. Here, duplexer 204 can feed noise canceller 110-C for TX to RX isolation as shown above. However, duplexer 204 can also feed noise canceller 110-B for TX mask improvement via summation circuit 402, and noise canceller 110-A can be used for RX mask improvement.

Figure 5:
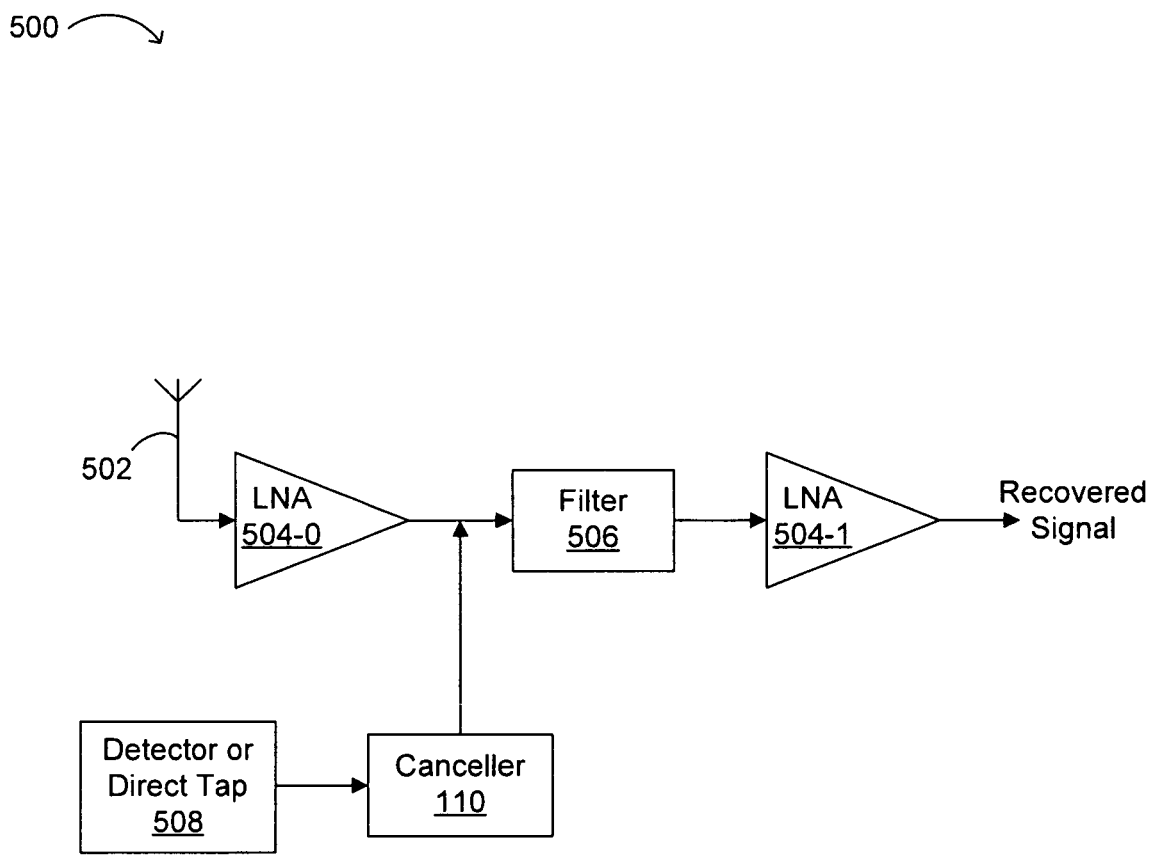
FIG. 5 is a block schematic diagram showing an example receiver using a noise canceller.

Referring now to FIG. 5, shown is a block schematic diagram 500 of an example receiver using a noise canceller. In this particular application, an antenna module used in the global positioning system (GPS) can include a patch antenna 502 that receives an electromagnetic signal, and provides a received signal to a first LNA 504-0. A filter 506 (e.g., a surface acoustic wave (SAW) filter, a bandpass filter, etc.) can receive an amplified signal from the first LNA, and provide a signal to a second LNA 504-1 for coupling the recovered signal to a coaxial cable.

Of course, many variations of the particular example shown in FIG. 5 may be found in certain embodiments. For example, multiple or different types of filters, other types of amplifiers, ordering of filter and amplifier devices or components, as well as different connection points (e.g., along a radio frequency (RF) signal path) for the noise canceller and detector can be selected. In one example, the active GPS antenna may not include the second LNA, but rather the second LNA may be part of an RF integrated circuit (RF-IC) on a main printed circuit board (PCB). In other examples, other types of circuitry for amplification or other functions can be used. Further, the detector and noise canceller as described herein can also detect and cancel interference, transmitter signals, and spurs.

In particular embodiments, an active GPS noise canceller antenna structure can include a noise canceller 110 and detector or direct tap 508 that are mated to, otherwise integrated with, or otherwise associated with, the antenna module. Thus, a standalone module can be created with an appropriate detector, such as an ultrathin detector (UTD), added to an active antenna. The noise canceller 110 with detector 508 may be placed as close as possible to the active antenna, such as in an arrangement on or with a common PCB as the active/patch antenna. Alternatively, the noise canceller can be placed under a shield covering the active devices (e.g., LNA, switches, etc.) of the antenna, with the detector on top of the shield. Such placement can ensure good correlation between the noise signatures, resulting in good cancellation.

A bus (e.g., a serial peripheral interface (SPI), a universal serial bus (USB), inter-integrated circuit bus ($I^2C$), etc.) may be used for communication to another component in order to optimize cancellation. Alternatively, a fixed setting may be stored in local memory, such as a nonvolatile type of memory (e.g., EEPROM flash memory, etc.) of an associated host system such that setting information can be downloaded into the device. Such a fixed setting can include information (e.g., gain, absolute temperature, temperature coefficient, etc.) about frequencies or other signal characteristics for cancellation. Alternatively, such memory (e.g., flash memory) may be located inside the noise detection and cancelling module, or be contained in the noise canceller IC itself. In any event, the noise canceller may be connected to a standard GPS, GSM, MTV, WLAN or WiMax chip/chipset, such as any available from MediaTEK, SiRF, Epson, Broadcom, Qualcom, Marvell, Dibcom, Megachips, etc., such that that the antenna and the LNA are relatively close together. Such a configuration provides low losses while retaining good reception.

Figure 6:
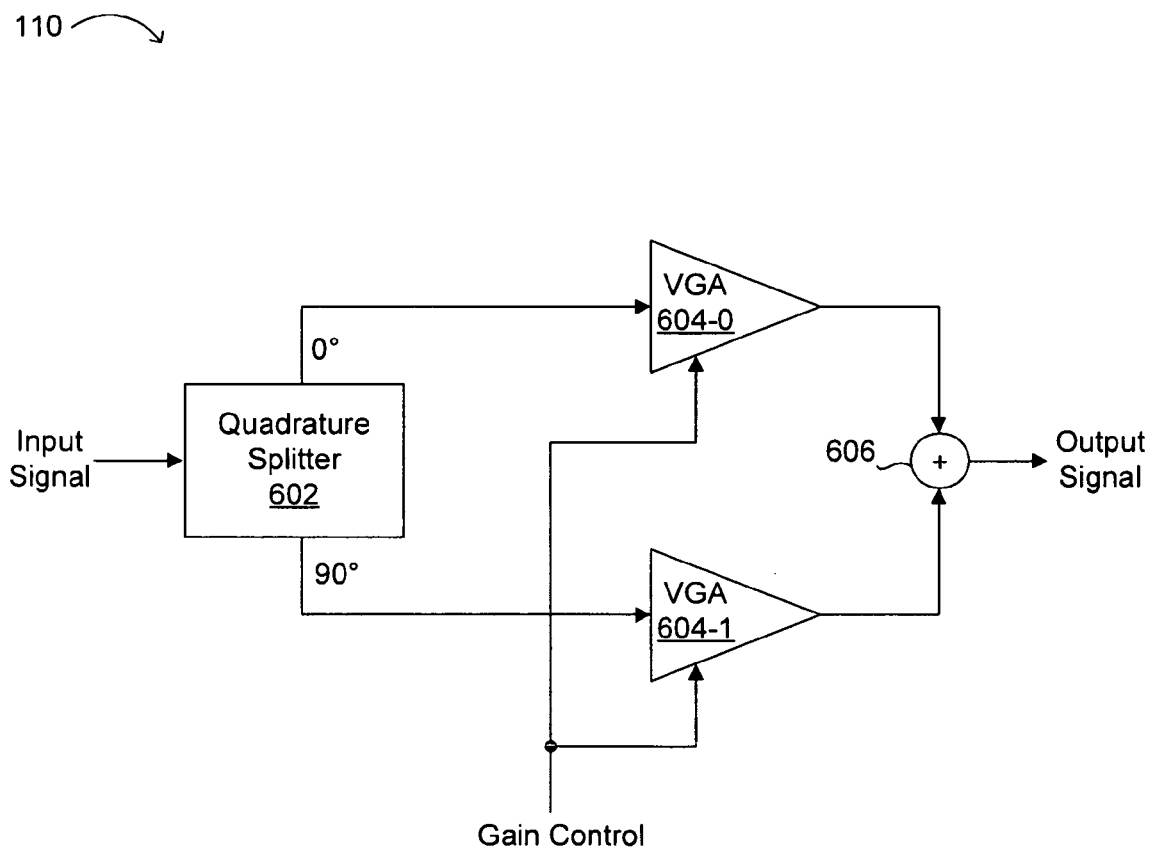
FIG. 6 is a block schematic diagram showing an example noise canceller structure.

Referring now to FIG. 6, shown is a block schematic diagram 110 of an example noise canceller structure. In this example, noise canceller 110 can be implemented as an IQ modulator that splits an input signal via quadrature splitter 602 into two separate signals, including an In-phase (I) signal and a Quadrature (Q) signal, that are approximately ninety degrees out of phase. The signals (I, Q) output from quadrature splitter 602 are said to be in quadrature. Quadrature splitter 602 may be implemented via various types of circuits, such as an LC, RC, LR, capacitive only, allpass, or polyphase filter.

The (I) signal is input to a first controllable amplifier (e.g., variable gain amplifier (VGA) 604-0), and the (Q) signal is input to a second controllable amplifier VGA 604-1, the outputs of which are added via summation circuit 606, yielding a phase-shifted and amplified signal as output. The adjustable amplifiers VGA 604 may be implemented via voltage controlled analog amplifiers, digitally controlled switch type amplifiers, or other suitable controllable amplifiers. Note that one or more of the amplifiers VGA 604 may be non-controllable without departing from the scope of the present teachings.

Figure 7:
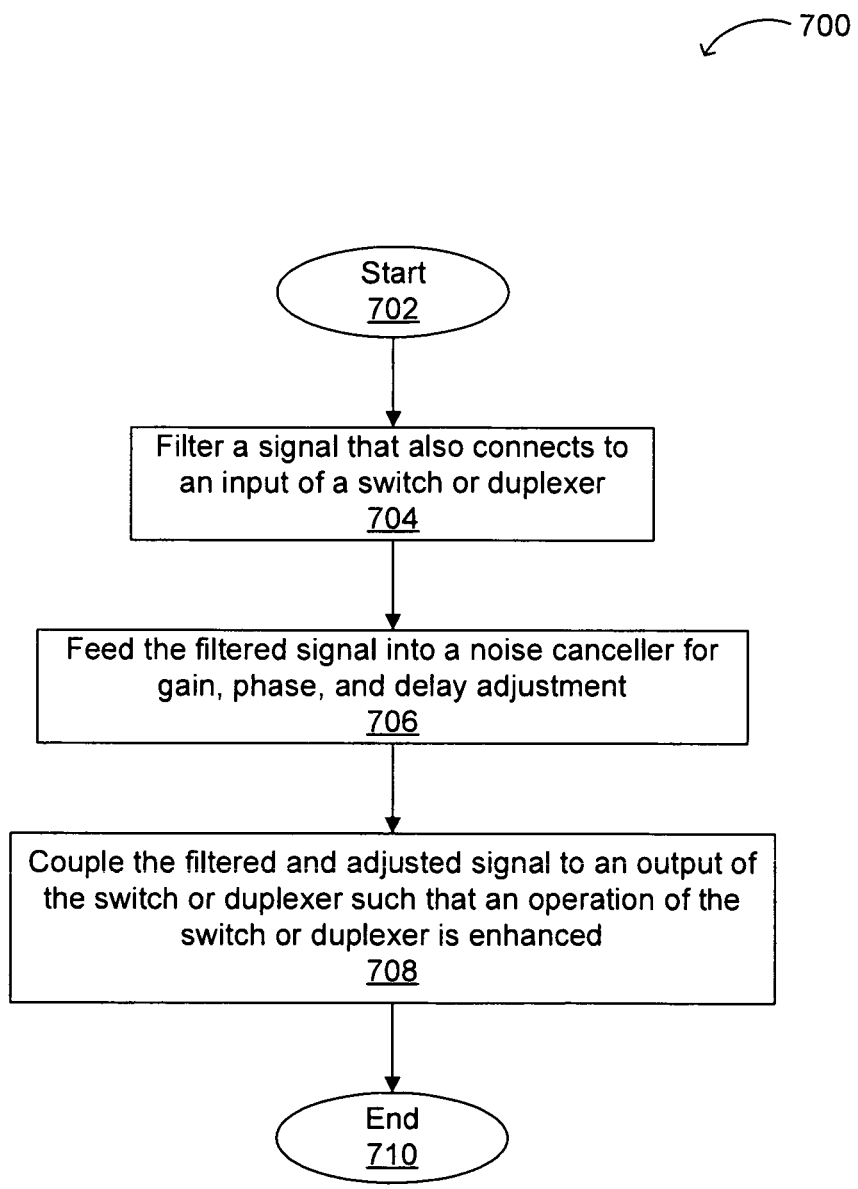
FIG. 7 is a flow diagram showing an example method of enhancing a signal selector operation.

Referring now to FIG. 7, shown is a flow diagram 700 of an example method of enhancing a signal selector. The flow begins (702), and the signal is filtered (e.g., via filter 108), where the signal also connects to an input of a switch or duplexer (704). The filtered signal can then be fed into a noise canceller (e.g., 110) for gain, phase, and/or delay adjustment (706). The filtered and adjusted signal can be coupled or summed with an output of the switch or duplexer (e.g., 106) such that an operation of the switch or duplexer is enhanced (708), completing the flow (710). As discussed above, switch leakage can be reduced and isolation can be improved by using a signal selector enhancer of particular embodiments.

Figure 8:
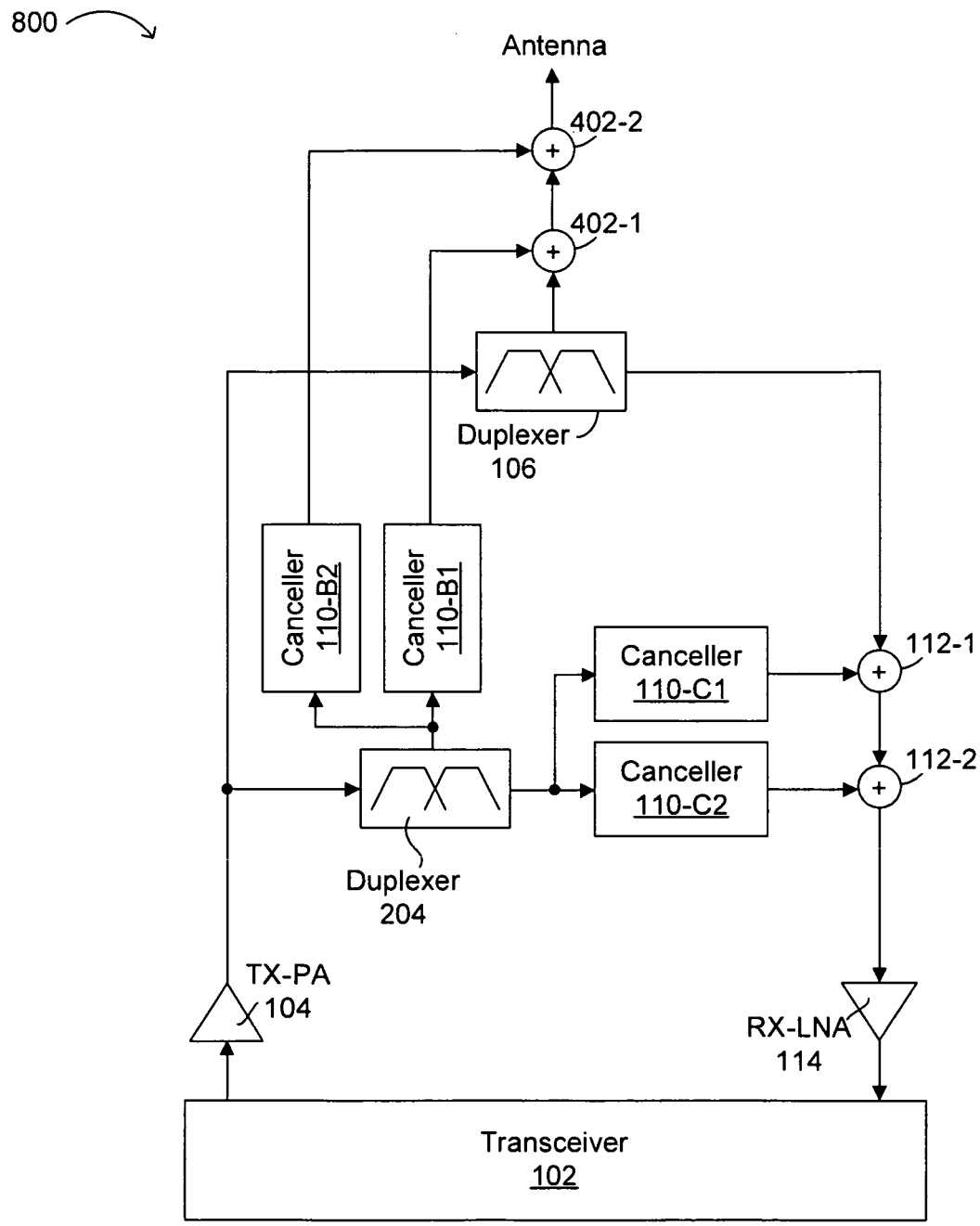
FIG. 8 is a block schematic diagram showing an example multi-canceller arrangement.

Referring now to FIG. 8, shown is a block schematic diagram 800 of an example multi-canceller arrangement. In this particular example, duplexer 204 can feed noise cancellers 110-C1 and 110-C2 via corresponding summation circuits 112-1 and 112-2 for improved TX to RX isolation of duplexer 106. Also, duplexer 204 can feed noise cancellers 110-B1 and 110-B2 for TX mask improvement via corresponding summation circuits 402-1 and 402-2. In this example, two or more cancellers (e.g., cancellers 110-B1 and 110-B2, as well as cancellers 110-C1 and 110-C2) can increase a bandwidth or amount of the associated isolation improvement, independent of the particular delay chosen in each cancellation path.

Such an approach can allow for more mismatch between the signal selector to be enhanced (e.g., duplexer 106) and a corresponding "matching filter" (e.g., duplexer 204), and as such is applicable to a variety of duplexers from different manufacturers and/or technologies, resulting in cost reductions. Also, in a frequency range where large variations in phase occur (e.g., in a TX-RX transition region), the cancellation bandwidth may be decreased, and this can be compensated for by adding another canceller solely for this area. In addition, notches of each canceller structure can be separately adjusted when all cancellers are activated to optimize signal selector enhancement results.

Enhancer designs as described herein allow for improved operation of associated switches and/or duplexers. In particular embodiments, detected noise signals can be cancelled so as to avoid detrimental performance (e.g., leakage, interference, etc.) on the associated switches and/or duplexers. Various aspects may be suited to antenna modules, base stations, portable computing devices, or any other applications where switch and duplexer isolation and performance can be improved.

Although particular embodiments of the invention have been described, variations of such embodiments are possible and are within the scope of the invention. For example, although particular enhancer arrangements and structures have been described and shown, other circuitry and functions, and the like can also be accommodated in accordance with various aspects. For example, while particular filter and noise canceller arrangements are shown, any suitable type of filtering, matching, noise detection and cancellation, etc., can also be used in particular embodiments. Also, applications other than the stations, portable computing devices, or the like, can also be accommodated in accordance with particular embodiments.

Any suitable programming language can be used to implement the functionality of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments unless otherwise specified. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as standalone routines occupying all, or a substantial part, of the system processing. The functions may be performed in hardware, software or a combination of both.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. Functions and parts of functions described herein can be achieved by devices in different places and operating at different times. For example, a processor can perform its functions in "real time," "offline," in a "batch mode," etc. Parallel, distributed or other processing approaches can be used.

Reference throughout this specification to "one embodiment", "an embodiment", "a particular embodiment," or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nano-engineered systems, components and mechanisms may be used. In general, the functions of the present invention can be achieved by any means as is known in the art. For example, distributed, networked systems, components and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

Thus, the scope of the invention is to be determined solely by the appended claims.

The invention claimed is:

1. A signal selector enhancer, comprising:
a signal selector configured to receive a signal at a first node, receive and transmit signals at a second node, and provide a received signal to a third node;
a filter configured to receive the signal from the first node and provide an output signal for receiver isolation and an output signal for transmission masking;
a receiver noise canceller configured to receive the output signal for receiver isolation and provide an adjusted filtered signal at the third node, the filter and the receiver noise canceller being coupled in parallel with the signal selector;
a transmission noise canceller configured to receive the output signal for transmission masking and provide a mask signal for noise cancellation at the second node; and
a first summation circuit configured to combine the adjusted filtered signal with the received signal provided to the third node such that an operation of the signal selector is enhanced.

2. The signal selector enhancer of claim 1, wherein
the receiver noise canceller is configured to cancel detected interference, noise, unwanted harmonics, and spurs,
the signal selector is further configured to provide a transmission signal at the second node for transmission via an antenna, and
the signal selector enhancer further comprises a second summation circuit configured to sum the mask signal and the transmission signal at the second node.

3. The signal selector enhancer of claim 1, wherein the filter is configured to at least partially match the signal selector.

4. The signal selector enhancer of claim 1, wherein the signal selector comprises a duplexer.

5. The signal selector enhancer of claim 1, wherein the signal selector comprises a switch.

6. The signal selector enhancer of claim 1, wherein
the signal selector is coupled at the second node to an antenna;
the first node is coupled to a transmit path of the antenna; and
the second node is coupled to a receive path of the antenna.

7. The signal selector enhancer of claim 1, further comprising:
a second filter coupled to a second noise canceller, wherein the second filter and the second noise canceller are coupled between the first node and the second node; and
a third filter coupled to a third noise canceller, wherein the third filter and the third noise canceller are coupled between the second node and the third node.

8. The signal selector enhancer of claim 1, further comprising a variable gain attenuator coupled between the filter and the receiver noise canceller.

9. The signal selector enhancer of claim 8, further comprising a coupler configured to provide an input from the first node to the filter.

10. The signal selector enhancer of claim 1, wherein the receiver noise canceller comprises a quadrature splitter configured to provide a first split output to a first amplifier and a second split output to second amplifier, wherein outputs of the first and second amplifiers are summed to form an output of the receiver noise canceller.

11. A method of enhancing a signal selector operation, the method comprising:
receiving, by a signal selector, a signal at a first node, receiving and transmitting signals at a second node, and providing a received signal to a third node;
filtering, by a filter, the signal from the first node to provide an output signal for receiver isolation and an output signal for transmission masking;
adjusting, by a receiver noise canceller, the output signal for receiver isolation to provide an adjusted filtered signal at the third node;

noise cancelling, by a transmission noise canceller, the output signal for transmission masking to provide a mask signal for noise cancellation at the second node; and combining, by a first summation circuit, the adjusted filtered signal with the received signal provided to the third node such that an operation of the signal selector is enhanced.

12. The method of claim 11, wherein the adjusting the filtered signal comprises cancelling detected interference, noise, unwanted harmonics of the signal, and spurs, and the method further comprises providing, by the signal selector, a transmission signal at the second node for transmission via an antenna, and summing, by a second summation circuit, the mask signal and the transmission signal at the second node.

13. The method of claim 11, wherein the filtering the signal comprises at least partially matching the signal selector.

14. The method of claim 11, wherein the adjusting the filtered signal comprises adjusting at least one of gain, phase, and delay.

15. The method of claim 11, wherein the signal selector comprises a duplexer.

16. The method of claim 11, wherein the signal selector comprises a switch.

17. A signal module, comprising:

an antenna configured to receive and transmit electromagnetic signals at a signal selector, the signal selector configured to receive a signal at a first node, receive and transmit signals at a second node, and provide a received signal to a third node;

a transmitter coupled to a transceiver, the transmitter being configured to provide a transmit signal at the first node;

a receiver coupled to the transceiver, the receiver being configured to receive a signal at the third node; and a signal selector enhancer, comprising a filter configured to receive the transmit signal from the first node and provide an output signal for receiver isolation and an output signal for transmission masking;

a receiver noise canceller configured to receive the output signal for receiver isolation and provide an adjusted filtered signal at the third node, the filter and the receiver noise canceller being coupled in parallel with the signal selector;

a transmission noise canceller configured to receive the output signal for transmission masking and provide a mask signal for noise cancellation at the second node; and a first summation circuit configured to combine the adjusted filtered signal with received signal provided to the third node such that an operation of the signal selector is enhanced.

18. The signal module of claim 17, wherein the receiver noise canceller is configured to cancel detected interference, noise, unwanted harmonics, and spurs, the signal selector is further configured to provide a transmission signal at the second node for transmission via an antenna, and the signal selector enhancer further comprises a second summation circuit configured to sum the mask signal for noise cancellation and the transmission signal at the second node.

19. The signal module of claim 17, wherein the filter is configured to at least partially match the signal selector.

20. The signal module of claim 17, wherein the signal selector comprises a duplexer.

* * * * *